United States Patent [19]

Jalali-Karchay

[11] 4,174,617
[45] Nov. 20, 1979

[54] TURBOCHARGER CONTROL SYSTEM
[76] Inventor: Mir Javid Jalali-Karchay, P.O. Box 300, Monrovia, Calif. 91016
[21] Appl. No.: 822,394
[22] Filed: Aug. 8, 1977
[51] Int. Cl.² ............................................. F02B 37/00
[52] U.S. Cl. ..................................... 60/602; 318/295
[58] Field of Search ................ 60/600, 602, 603, 605, 60/611; 318/293, 295, 481

[56] References Cited
U.S. PATENT DOCUMENTS

| 2,376,142 | 5/1945 | Hoffman et al. | 60/602 X |
| 2,477,668 | 8/1949 | Sparrow | 60/602 X |
| 2,491,380 | 12/1949 | Kutzler | 60/602 X |
| 2,622,390 | 12/1952 | Newton | 60/602 |
| 3,096,614 | 7/1963 | Silver et al. | 60/602 |
| 3,199,009 | 8/1965 | Lien et al. | 318/295 X |
| 3,323,031 | 5/1967 | Kasper et al. | 318/295 X |
| 3,925,989 | 12/1975 | Pustelnik | 60/602 |

*Primary Examiner*—Carlton R. Croyle
*Assistant Examiner*—Michael Koczo, Jr.
*Attorney, Agent, or Firm*—Bruce L. Birchard

[57] ABSTRACT

By comparing with the magnitude of a sea-level reference parameter, an electrical parameter in a pressure-temperature sensor or sensors coupled to the air induction system of an internal combustion engine, particularly a turbocharged engine, a control signal may be derived which will automatically adjust the flow of exhaust gas to the turbocharger and will automatically result in constant engine power from sea level to a critical altitude.

10 Claims, 5 Drawing Figures

TURBOCHARGER CONTROL SYSTEM

BACKGROUND OF THE INVENTION

1. Field of the Invention

This invention relates to turbocharged internal combustion engines and, more particularly, to systems for maintaining power from such engines at pre-set levels.

2. Prior Art

It is well known that atmospheric pressure varies from location-to-location and decreases with an increase in altitude. Internal combustion engines which rely on mixing oxygen with a fuel to produce power operate differently at different atmospheric pressures for the obvious reason that the weight of oxygen available in a given volume of air varies with atmospheric pressure. In engine studies this fact is expressed in terms of intake manifold absolute pressure. A decrease in intake manifold absolute pressure causes a decrease in engine power output. This problem of reduced power with reduced atmospheric pressure is particularly significant in aircraft engine operation, although it is also recognized as a factor in diesel and other engine operation. To overcome this problem, pressurizing the air at the intake manifold has been adopted in many engines, particularly aircraft engines. Pressurizing the air has been achieved by means of rotary compressors driven by exhaust turbines, the latter deriving their power from the flow of exhaust gases from the associated engines.

The speed of such a turbocharger must be regulated to prevent excessive intake manifold pressures, such excessive pressures causing engine over-heating and consequent engine damage. Turbocharger speed regulation is achieved by diverting a portion of the exhaust gases through a wastegate instead of permitting all of the exhaust gases from passing through the turbine. In prior art systems the wastegate actuator was operated by engine oil pressure and positioned the wastegate valve in the exhaust bypass. When engine oil pressure closed the wastegate, all exhaust gases were routed through the turbine giving maximum intake air compression. The amount the wastegate was opened determined the portion of the exhaust gases by-passing the turbine and the portion driving the turbine, and hence, the degree to which the intake air was compressed. The automatic wastegate controller of the prior art mechanically sensed the manifold pressure and adjusted oil pressure to a piston coupled to the wastegate valve. When oil pressure was increased on the piston, the wastegate valve moved toward the "closed" position, and engine output power increased. Conversely, when the oil pressure was decreased, the wastegate valve moved toward the "open" position, and output power was decreased.

The position of the piston attached to the wastegate valve was dependent on bleed oil which controlled the engine oil pressure applied to the top of the piston. Oil was returned to the engine crankcase through two control devices, the density controller and the differential pressure controller. These two controllers, acting independently, determined how much oil was bled back to the crankcase, and thus established the oil pressure on the piston.

The density controller was designed to limit the manifold pressure below the turbocharger's critical altitude, and regulated bleed oil only at the "full throttle" position. The pressure and temperature-sensing bellows of the density controller reacted to pressure and temperature changes between the fuel injector inlet, (if fuel injection was utilized) and the turbocharger compressor. The bellows, filled with dry nitrogen, maintained a constant density by allowing the pressure to increase as the temperature increased. Movement of the bellows re-positioned the bleed valve, causing a change in the quantity of bleed oil, which changed the oil pressure on top of the waste-gate piston.

The differential pressure controller functioned during all positions of the waste-gate valve other than the "fully open" position, which was controlled by the density controller. One side of the diaphragm in the differential pressure controller sensed air pressure upstream from the throttle; the other side sampled pressure on the cylinder side of the throttle valve. At the "wide open" throttle position when the density controller controlled the wastegate, the pressure across the differential pressure controller diaphragm was at a minimum and the controller spring held the bleed valve closed. At "part throttle" position, the air differential was increased, opening the bleed valve to bleed oil to the engine crankcase and re-position the wastegate piston.

This prior art mechanical system for wastegate control was heavy, expensive, slow to respond, ineffective in maintaining the proper air-fuel ratio for high performance and low pollution, as altitude and air density changed and not fail-safe.

Therefore, it is a general object of this invention to provide an improved turbocharger system.

It is a further object of this invention to provide an improved control system for an automatic turbocharger.

It is a still further object of this invention to provide a lightweight, inexpensive, short-response-time wastegate control system for an automatic turbocharger.

It is an additional object of this invention to provide an automatic turbocharger control system which exhibits fail-safe characteristics.

It is a further object of this invention to provide a wastegate control system which will cause an automatic turbocharger to maintain, despite altitude and air-density variations, the proper air-fuel ratio in an associated engine whereby high performance and low pollution are consistently obtained.

SUMMARY OF THE INVENTION

Stated succinctly, a variable resistance having a value which varies with intake manifold air pressure and temperature is coupled to a comparator wherein the value of the variable resistance is compared with the value of a pre-set total resistance corresponding to a desired manifold pressure and any difference in resistance results in a correction voltage which is applied, with the proper polarity, to a d.c. motor coupled through a gear box (containing a worm gear-worm combination) to the wastegate, the application of such voltage resulting in the turning of the wastegate to a position where the resultant intake manifold absolute air pressure, as produced by the turbocharger and as represented by a first resistance value, equals the desired manifold air intake pressure, as pre-set and as represented by a second resistance value, at which balanced condition the voltage applied from the comparator to the wastegate drive motor becomes zero. Changes in manifold pressure with altitude are automatically corrected by this system and the engine power remains substantially at its pre-set value up to the critical altitude of the system.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in conjunction with the accompanying drawings, in which:

DESCRIPTION OF THE PREFERRED EMBODIMENT

Figures 1, 5:
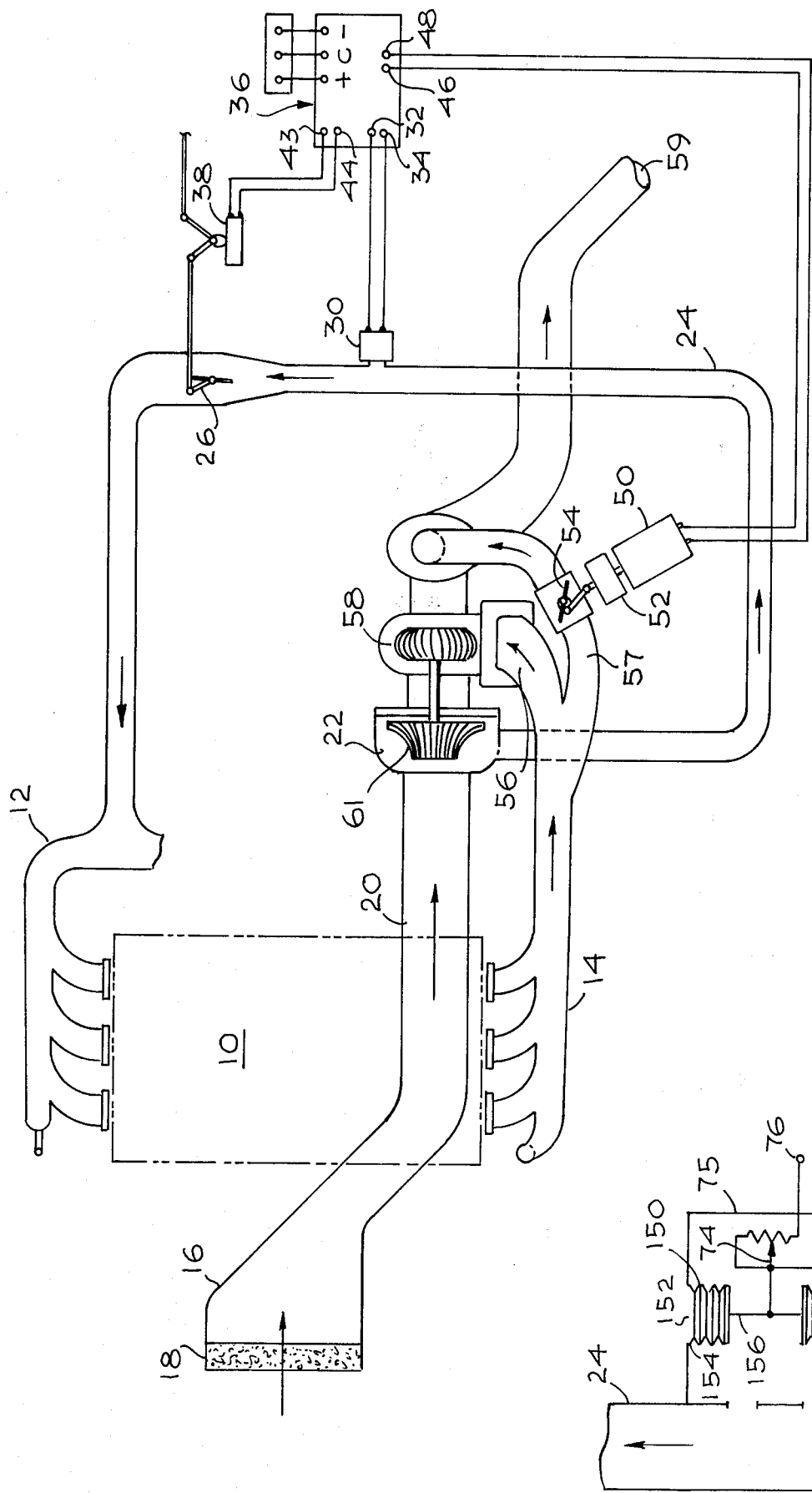
FIG. 1 is a schematic flow diagram of a turbocharger control system according to the present invention.

In FIG. 1, engine 10 (shown symbolically), which may be of the fuel injection or diesel type, has an intake manifold 12 and an exhaust manifold 14. For simplification purposes the second exhaust manifold is not shown. In a fuel injection system the air from the intake manifold is mixed with the injected and vaporized fuel in the induction system near the intake valves. If the air pressure is below a predetermined level, say sea-level pressure or 29.92 inches of mercury and the air temperature is above a reference temperature, say 59° F., the air-fuel mixture is unduly rich and the amount of power obtained from the engine 10 and its efficiency, are reduced. The air which reaches intake manifold 12 originates at air intake 16 which includes filter 18. Air flows from intake 16 through duct 20, through rotary compressor chamber 22 into duct 24 and past throttle valve 26 into intake manifold section 12 from which the air may be mixed with fuel in an injection system, not shown, and such air/fuel mixture used to power engine 10. Communicating with duct 24 is sensor housing 30 including a combination pressure-temperature sensor or sensors responsive to changes in temperature and pressure of the air flowing to intake manifold 12. The details of one form of the sensor are set forth in FIG. 2. According to one embodiment of the invention the sensor or sensors transform pressure and temperature changes into electrical resistance changes. These resistance changes appear across input terminals 32 and 34 of comparator 36. Throttle control 38 permits the setting of desired manifold pressure or engine power by the pilot. Adjustment of throttle control 38 results in the pre-setting of the value of a resistive element 40, shown schematically in FIG. 4. Such resistive element is connected to terminals 43 and 44 in comparator 36. The value of the total resistance 42 in sensor housing 30 in combination with the value of trimmer resistor 88 (see FIG. 4) and the resistance of thermistor element 71 is compared with the value of the pre-set resistance 40 in throttle control 38 (in combination with any series trimmer resistance such as that provided by resistor 90 in FIG. 4), and any differential results in a correctional signal being generated at terminals 46 and 48 of comparator 36. Such correctional signal, which has bi-polar possibilities, is applied to d.c. electrical motor 50 which is coupled through gear box 52, (containing a worm gear and a worm) to wastegate 54 in by-pass duct 57 causing the opening or closing of that wastegate 54 to control the volume of exhaust gas from exhaust manifold 14 (and its counterpart, not shown) flowing through duct 56 and turbine 58 to exhaust tailpipe 59. Of course, the amount of such flow will determine the speed of rotation of turbine 58 and, as a result of the action of centrifugal pump 61 driven by turbine 58, the pressure and volume of the air flowing in duct 24. A measure of the temperature and pressure of the air flowing from duct 24 into intake manifold 12 is taken by the sensor or sensors associated with housing 30 and a resistance value representative of the weight of air per unit time being supplied to intake manifold appears in the comparator circuit as the magnitude of the resistance of resistor 42 in FIG. 4. If the magnitude of the resistance from the sensors (in combination with any trimmer resistor component resistance) differs from the magnitude of the reference resistance 40 (in combination with the resistance of trimmer 90), a correction potential is applied to motor 50, as was previously indicated, and wastegate 54 is opened or closed to divert from, or channel to, turbine 58, exhaust gases from engine 10, until the sensors indicate that the predetermined manifold pressure exists.

Figure 2:
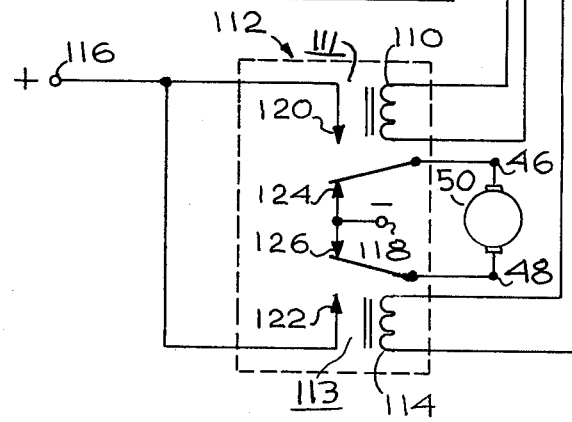
FIG. 2 is a schematic diagram of one form of temperature-pressure sensor for use with the present system.
Figure 2:
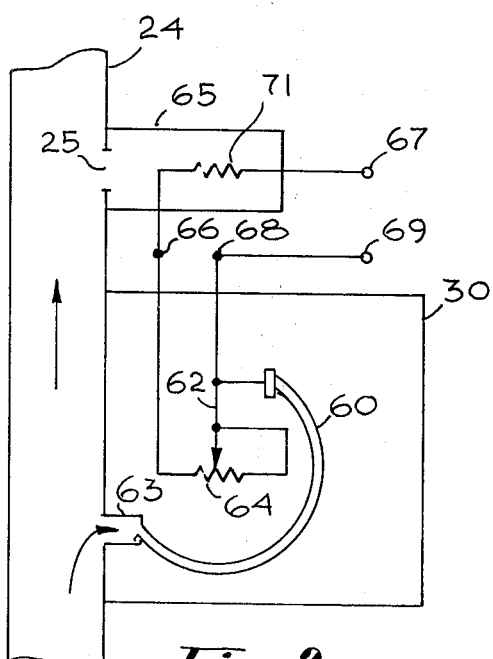

A schematic representation of one pressure-temperature sensor combination that may be used is shown in FIG. 2. A Bourdon tube 60 is used to sense the pressure of the air in intake manifold duct 24. Some of that air flows into inlet 63 and tends to straighten that tube because the resulting internal pressure of tube 60 exceeds the external pressure around tube 60. As tube 60 straightens it pulls wiper arm 62 across resistor element 64 and changes the resistance value appearing between terminals 66 and 68.

A temperature sensitive resistor or thermistor 71, may be mounted internally to container 65 which communicates with duct 24 through opening 25. Thermistor 71 is connected in series between terminal 66 and sensor output terminal 67. The remaining sensor output terminal 69 is connected to terminal 68.

Container 30 may be hermetically sealed with its internal atmosphere being maintained at 14.7 lbs. per square inch (sea level pressure) at 59° F. Thus, if the manifold intake pressure is less than that pressure, tube 60 will bend and move slider 62 changing the resistance appearing at terminals 66, 69 and, consequently, at comparator terminals 43, 44, thus causing imbalance in the input portion of the circuit of FIG. 4 and application of a correcting voltage to wastegate motor 50 until the pressure in duct 24 is equal to sea level pressure at 59° F., at which time the imbalance of input resistance in comparator 36 arising from insufficient intake-manifold pressure will disappear.

Temperature sensitive resistor 71 will cause compensation for changes in intake air temperature, higher air temperatures meaning lower air density and consequent reduction in the air-fuel ratio at the intake manifold 12 of engine 10.

Figure 3:
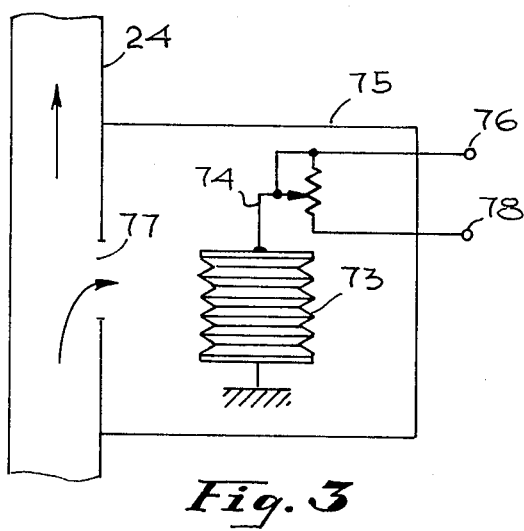
FIG. 3 is a schematic diagram of a second form of a temperature-pressure sensor for use in the system of FIG. 1.

In FIG. 3, aneroid chamber 73, of the type used in an aneroid barometer, is hermetically sealed with a nitrogen atmosphere, for example, inside at a pressure of 14.7 lbs. per square inch at 59° F. Chamber 73 is surrounded by container 75 which is supported from duct 24 and the inner portion of container 75 communicates with the inner portion of duct 24 through opening 77. Thus, the pressure and temperature within duct 24 becomes the pressure and temperature within container 75. Chamber 73 expands and contracts in response to both the temperature and pressure of the air being supplied to intake manifold 12 of engine 10.

If the intake manifold pressure is below sea-level pressure, chamber 73 expands, moving resistor wiper arm 74 (by reason of the mechanical connection therebetween) and changes the resistance appearing between terminals 76 and 78. As a consequence, an imbalance occurs in the input portion of comparator 36 and wastegate 54 is caused to move to a corrective position by motor 50, as described in connection with FIG. 2. A rise in temperature of the gas within chamber 73 causes similar expansion of chamber 73 and, ultimately, greater pressure in the air in intake duct 24 to compensate for the lower density of air corresponding to its higher temperature. Thus, the sensor including chamber 73 corrects manifold pressure in response to both temperature and pressure changes of the air in duct 24.

In FIG. 5 a sensor responsive to absolute pressure is shown. Aneroid element 73, of the type described in connection with FIG. 3, is mechanically coupled through a second accordian-like diaphragm or bellows 150 to housing 75 in which an aperture 152 has been provided cooperating with the open end 154 of diaphragm 150. Diaphragm 150 senses the difference in pressure between the ambient atmospheric pressure and the pressure internal to housing, 75, i.e., substantially the intake manifold pressure. Element 73 is sealed, as previously described, and measures the difference between intake manifold pressure and sea level pressure. Slider arm 74, being coupled to the mechanical linkage 156 between element 73 and diaphragm 150 is moved in proportion to the net expansion or contraction of element 73 and diaphragm 150. Thus, manifold absolute pressure is measured and is represented by the output resistance between terminals 76 and 78.

Figure 4:
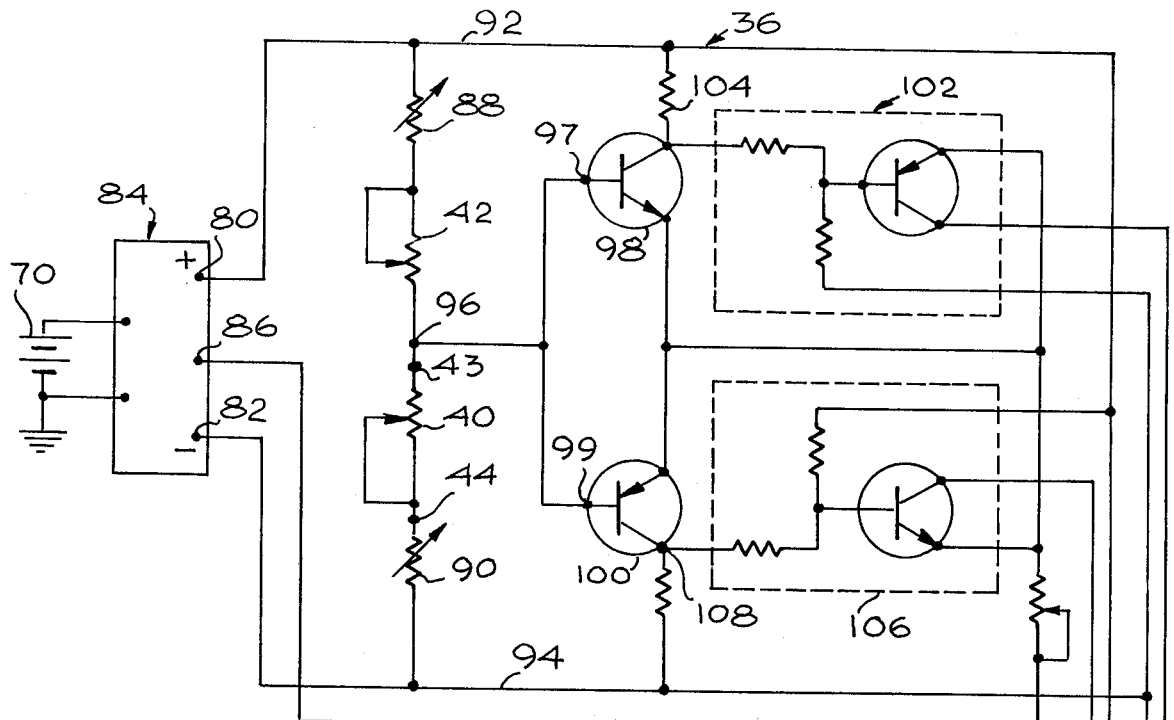
FIG. 4 is a schematic diagram of an electrical circuit to be utilized in the system of FIG. 1; and, FIG. 5 is a schematic diagram of a third form of temperature-pressure sensor for use with my invention.

The circuit for accomplishing the comparison of sensor resistance with reference resistance, i.e., the circuit for comparator 36 may be that set forth in FIG. 4.

In that circuit, a local unbalanced power source 70, such as the battery supply in an aircraft, is used to develop across terminals 80 and 82 of balanced power source 84, positive and negative potentials respectively, of an adjustably-regulated low magnitude, such as 5 volts, sufficient to operate present-day transistors or linear I-C's. Terminal 86 is the common potential or current return point for supply 84. Circuits for deriving balanced d.c. voltages from unbalanced sources are well known and need not be described here. Resistors 88, 42, 40 and 90 form a voltage divider between positive bus 92 and negative bus 94 and the junction 96 between the two variable resistors 40 and 42 is connected to the respective base terminals 97 and 99 of two transistors, 98 and 100. Transistor 98 is an NPN transistor and transistor 100 is of the PNP type. They are operating in, complementary, reverse Schmitt trigger circuits.

Amplifier 102 is coupled to the collector 104 of transistor 98 and amplifier 106 is coupled to the collector 108 of transistor 100. Amplifier 106 is coupled to solenoid 110 of single-pole, double-throw, normally-open relay 111. Amplifier 102 is coupled to solenoid 114 of relay 113. The two single-pole, double throw relays are carried by relay board 112. Positive and negative operating voltages for motor 50 are applied to terminals 116 and 118, respectively, from an appropriate power source, not shown. Those positive voltages appear at fixed contacts 120 and 122.

Operation of the system of FIGS. 1 through 4 is as follows. For initial set-up at the factory or maintenance hangar, with engine 10 operating at a reference altitude and temperature, such as sea level and 59° F., and with throttle control 38 at a minimum setting, the total value of the resistance in the combination of resistors 88 and 42 is made equal to the total resistance value of resistors 40 and 90, by adjusting trimmer resistors 88 and/or 90, which may be screwdriver adjustable or fixed resistors to prevent casual and unintended adjustment. Wastegate 54 is set, manually, to an initial, or idling, position in by-pass duct 57, that is, open or nearly so. It is to be understood that variable resistor 42 may be made up of several variable resistors, as in FIG. 2.

When engine 10 is to be loaded, as when an airplane containing that engine is to be flown, throttle control 38 is advanced, the value of resistor 40 changes, the potential of point 96 moves away from neutral, causing either transistor 98 or 100 to go into conduction, in turn causing relay 111 or 113 to be activated and closing the current path from terminals 116 and 118 through motor 50 with such a polarity as to close wastegate 54 until the desired manifold pressure is detected by sensor 60 or 73 and wiper arm 62 or 74 has moved to a position where the resistance presented by resistor 42 is such as to bring the potential of point 96 back to neutral. As higher altitudes are reached or if a significant rise in outside air temperatures occur, or both, the manifold absolute pressure at intake manifold section 12 tends to fall below the pre-selected value. This drop is detected by sensor element 60 or 73 and such sensor element causes the electrical value of resistor 42 to change. When that electrical value changes, point 96 departs from electrical neutral and either transistor 98 or 100 is automatically triggered on, depending on what rotational direction of motor 50 is required to further close wastegate 54 and restore the desired manifold pressure and engine power. When the desired manifold absolute pressure is restored, that condition is sensed by sensor 60 (or 73) and the value of the resistance of resistor 42 (in combination with the value of resistance of trimmer resistor 88) becomes equal to the value of the resistance of resistor 40 (in combination with the value of the resistance of trimmer 90). Point 96 returns to zero potential. Both transistors 98 and 100 are turned off. Current flow to solenoids 110 or 114 ceases, and relays 111 and 113 open removing potential difference from motor 50 causing it to cease operating. It should be noted that solid state relays may be substituted for the mechanical relays shown. Because of the worm gear-worm mechanical coupling between motor 50 and wastegate 54, wastegate 54 will remain set at the last position to which it was adjusted by motor 50, despite strong rotational forces upon it produced by the exhaust gases from engine 10. This feature is of particular importance if there is an electrical failure on ascent. Conventionally, such failure would result in wastegate 54 flying open under the pressure of exhaust gases from engine 10. If such an event occurred there would be a sudden loss of engine power which could be fatal. No such hazard exists with this invention because it has inherent "memory" as to the predetermined and pre-set adjustment of wastegate 54. A further feature of the worm gear-worm combination in gear box 52 is that the worm gear carries teeth over only a 90° arc of its perimeter. Thus, when wastegate 54 is completely closed no further closing force is applied to it through gearbox 52. The worm gear is spring-biased towards the worm so that when motor 50 reverses direction, wastegate 54 will be opened to the extent determined by the sensor system.

Up to an altitude where rotary pump 61 cannot produce the pre-set manifold pressure (that altitude being referred to as the "critical altitude") the system according to my invention automatically adjusts the intake manifold pressure to sustain the predetermined power of engine 10. On descent of the aircraft, sensor 60 (or 73) detects increased manifold pressure, and resistor 42 changes in value in the opposite direction to that in which it changed on ascent. The opposite transistor is triggered and the opposite polarity potential is applied to motor 50 through relay 111 or 113, respectively. As a result, motor 50 rotates in the opposite direction from that in which it rotated on ascent, and wastegate 54 is opened sufficiently to reduce the speed of turbine 58 and rotary pump 61 so that the intake manifold pressure, as sensed by Bourdon tube 60 or aneroid chamber 73, returns to the pre-selected value. Engine 10 then operates at the desired power level.

As has been indicated, motor 50 may be coupled to wastegate 54 through a gearbox 52 comprising a worm gear and worm. With such a gearbox, wastegate 54 would stay at the preselected position and engine 10 would operate at the intended power level despite failure of the wastegate control system and despite pressure upon the wastegate itself. Such is not the case with hydraulic systems which rely on oil pressure for positioning of the wastegate.

While much of this discussion has revolved around aircraft engines, the same advantages of my invention can be achieved with diesel engines or other internal combustion engines for terrestrial applications.

While a particular embodiment of my invention has been shown and described, it will be apparent to those skilled in the art that variations may be made therein without departing from my invention. It is the intention of the claims which follow to cover all such variations.

I claim:

1. A turbocharger control system for an internal combustion engine having a throttle, an intake manifold and an exhaust manifold, including:
    a pressure sensor coupled to said intake manifold and responsive to changes in the air pressure therein to produce a change in a first electrical parameter;
    variable electrical means coupled mechanically to said throttle and responsive to the setting of said throttle to set a second electrical parameter of the same type as first electrical parameter;
    a comparator circuit including balanced means for comparing the respective total magnitudes of said first and second parameters and trigger means responsive to any imbalance between said total magnitudes of said first and second parameters for producing a correctional output voltage having a polarity indicative of the relative sizes of said total magnitudes of said first and second parameters, respectively;
    a gas-driven turbine;
    an exhaust gas duct adapted to be coupled at one end to said exhaust manifold and at the other end to said turbine;
    an air duct coupled to said intake manifold;
    an air compressor;
    coupling means for mechanically coupling said air compressor to said turbine, said air compressor being pneumatically coupled to said air duct for the flow of air therebetween;
    a by-pass duct coupled to said exhaust-gas duct between said exhaust manifold and said turbine for by-passing exhaust gas around said turbine;
    a wastegate adjustably mounted in said by-pass duct for controlling the extent of the by-passing of exhaust gas around said turbine;
    a reversible electrical motor having electrical terminals;
    driving means coupling said motor to said wastegate; and,
    electrical means coupling said terminals of motor to said comparator circuit for operating said motor, in response to said correctional output voltage, in such a direction that said wastegate is positioned to cause the restoration of the balance between the total magnitudes of said first and second parameters, respectively.

2. A system according to claim 1 which includes, in addition, a temperature sensor coupled to said intake manifold and responsive to changes in air temperature therein to produce a change in a third electrical parameter of the same type as said first parameter;
    a comparator circuit including balanced means for comparing the total magnitude of said first and third parameters with the magnitude of said second parameter.

3. A system according to claim 2 in which said pressure and temperature sensors are combined in a unitary device.

4. A system according to claim 3 in which said unitary device is an aneroid chamber containing gas at a predetermined pressure for a given ambient temperature.

5. A system according to claim 2 in which said temperature sensor is a thermistor.

6. A system according to claim 2 in which said first, second and third electrical parameters are electrical resistance.

7. A system according to claim 1 in which said trigger means includes complementary transistors connected in Schmitt configuration.

8. A system according to claim 1 in which said balanced means includes a balanced d.c. power supply having positive, negative and common terminals and positive and negative buses connected to said positive and negative terminals, said first and second parameters, respectively, appearing in series electrical connection between said positive and negative buses.

9. A system according to claim 1 in which said electrical means includes a pair of normally open, single-pole, double-throw relays.

10. A system according to claim 1 in which said coupling means includes a worm gear-worm combination.

* * * * *